D. A. GARDEN.
RESILIENT TIRE.
APPLICATION FILED NOV. 12, 1921.

1,424,468.

Patented Aug. 1, 1922.

INVENTOR
D. A. Garden.
By Bakewell & Church
ATTORNEYS

UNITED STATES PATENT OFFICE.

DAVID A. GARDEN, OF ST. LOUIS, MISSOURI.

RESILIENT TIRE.

1,424,468.　　　　Specification of Letters Patent.　　Patented Aug. 1, 1922.

Application filed November 12, 1921. Serial No. 514,665.

*To all whom it may concern:*

Be it known that I, DAVID A. GARDEN, a citizen of the United States, residing at St. Louis, Missouri, have invented a certain new and useful Improvement in Resilient Tires, of which the following is a full, clear, and exact description, such as will enable others skilled in the art to which it appertains to make and use the same.

This invention relates to resilient tires of the type which comprise coiled springs arranged between a jointed tread portion and a rigid rim that surrounds the felloe of the wheel on which the tire is used.

The main object of the invention is to provide a practicable tire of the general character referred to that is capable of successfully withstanding the terrific side stresses to which vehicle tires are subjected when in service.

Another object is to provide a spring tire in which the tread portion is rugged enough to form an efficient tread for a tire that is intended to be subjected to heavy loads but has sufficient flexibility to permit the springs to absorb the shocks produced by irregularities or obstructions in the road over which the tire travels.

And still another object is to provide an efficient spring tire of simple design which is so constructed that it can be applied to and removed from a vehicle wheel in the same manner as the demountable rims now universally used for holding pneumatic tires on wheels.

Figure 1 of the drawings is a top plan view, partly broken away of a portion of my improved spring tire.

Figure 1:
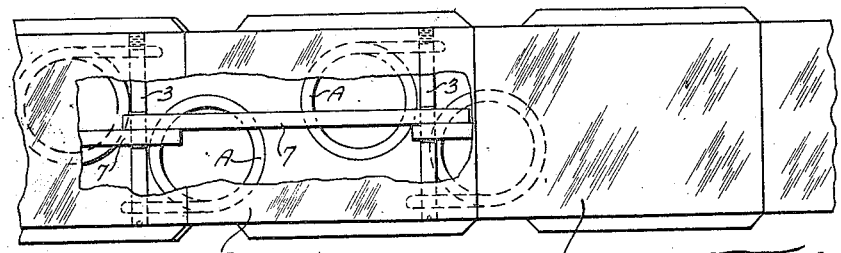

Referring to the drawings which illustrate the preferred form of my invention, A designates a plurality of coiled springs that are arranged between a rigid rim B and a jointed tread portion composed of a plurality of segmental-shaped members C arranged in overlapping relation with each other and combined in such a way that they can move relatively to each other, when the tire is in service. The rim B is intended to be removably mounted on a wheel (not shown) and retained in position thereon by any of the various means now universally used for securing demountable rims such as are used for carrying pneumatic tires. The springs A are preferably arranged in staggered relation, as shown in Figure 1, and are combined with the segmental-shaped members C constituting the tread portion of the tire in such a manner that a pair of springs A is associated with each of the tread members C, said springs being connected at their inner ends to the rim B and at their outer ends to the tread members C. In the form of my invention herein illustrated each of the springs A has its inner end connected to a lug 1 on the outer side of the rim B and is provided at its outer end with an eye 2. The springs of each pair are so arranged that the eyes 2 at the outer ends of the springs of a pair are arranged in transverse alignment, as shown in Figure 1, thus permitting a transversely-disposed pin 3 to be passed through said eyes and through a lug or portion 4 on the inner side of the tread member C with which said pair of springs co-operate so as to pivotally connect said springs and tread member together.

Figure 2:
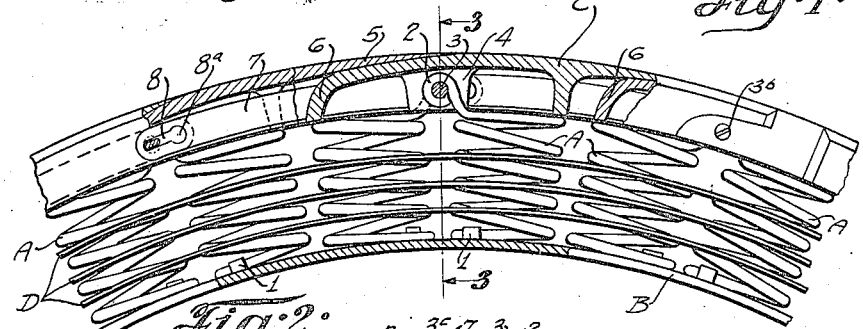
Figure 2 is a view of said tire partly in longitudinal section and in side elevation.
Figure 3:
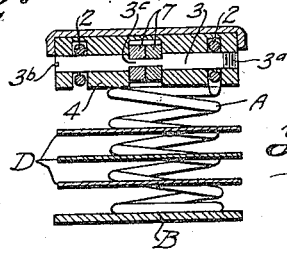
Figure 3 is a transverse sectional view, taken on the line 3—3 of Figure 2.
Figure 4:
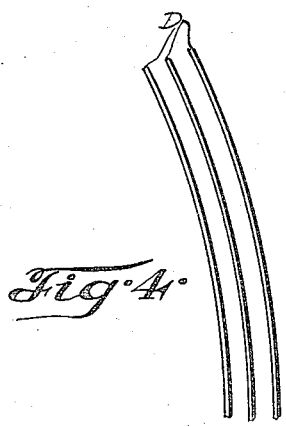
Figure 4 is a side elevational view, illustrating the resilient bands through which the coiled springs are threaded.

Preferably the eyes 2 on the springs A of each pair are arranged in slots or grooves in the portion 4 of the tread member with which said pair of springs co-operate as shown in Figure 3, and the transversely-disposed pin 3 that connects the springs to the portion 4 of the tread member is provided at one end with an externally screw-threaded portion 3ᵃ that is screwed into an internally screw-threaded hole in the portion 4 and provided at its opposite end with a screw driver slot 3ᵇ or similar means so as to facilitate the insertion and removal of the pin 3. When the springs A and tread members C are combined together in this manner each of the tread members C will be pivotally connected intermediate its ends to a pair of coiled springs whose inner ends are connected to a rim B which surrounds the felloe of the wheel. The particular shape of the tread members C is immaterial, so far as my broad idea is concerned, but I prefer to make the tread members C of such form that they will lap over each other, as illustrated in Figure 2. Thus, in the form of my invention herein illustrated each of the tread members C is provided at one end with a prolonged extension 5 having a substantially feather-edged terminal and provided at its opposite end with an inwardly-curved portion 6 over which the feather-edged extension of an adjacent member C overlaps.

The various sets of springs A and the tread members C that are associated with same are tied together by a means that extends circumferentially around the tire and which is so constructed that it will hold the tread members C in operative relationship with each other, but will permit said members to rock and also move inwardly and outwardly a limited distance with relation to the rim B of the tire.

The means just referred to that I prefer to use consists of a series of short, segmental-shaped links 7 arranged circumferentially around the tire with their ends in overlapped relation, as shown in Figure 1, and provided with holes through which the transversely-disposed pins 3 pass, thus causing the links 7 to be pivotally connected together and also pivotally connected to the pairs of springs A with which the tread members C are associated. In order to lock the pins 3 in the tread members C and also prevent the links 7 from moving transversely with relation to said pins, each of the pins 3, with the exception of one pin which I will refer to as a locking pin, is provided at its center with a flat portion $3^c$, as shown in Figure 3, that is seated in elongated slots 8 in the overlapped portions of the two links 7 with which said pin co-operates. In assembling the parts of the tire, the pins 3, with the exception of the locking pin above referred to, are passed transversely through aligned circular holes $8^a$ in the links 7 that form continuations of the elongated slots 8 previously referred to, and the links 7 are then moved circumferentially of the tire in a direction to cause the flat portions $3^c$ of the pins 3 to be positioned in the elongated slots 8 in the links 7, thus causing the pins 3 to be locked in the tread members C and the links 7 to be held securely against sidewise movement. Thereafter, the locking pin, which is not provided with a flat portion $3^c$, is arranged in operative position in the tread member C with which it co-operates, said locking pin operating to prevent the links 7 from moving circumferentially in the opposite direction, or, in other words, in a direction to cause the flat portions $3^c$ on the pins 3 to pass out of engagement with the elongated slots 8 in the links 7.

Figure 5:
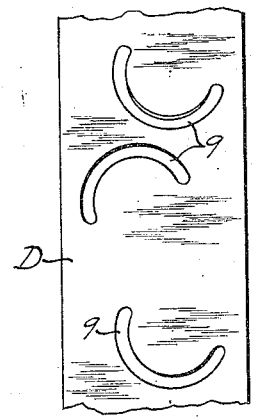
Figure 5 is a top plan view of one of said bands.
Figure 6:
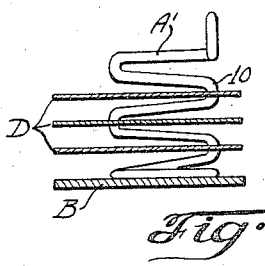
Figure 6 is a cross-sectional view similar to Figure 3, illustrating a slight modification of my invention.

In order to take up the side stresses to which the tread portion of the tire is subjected when the tire is in service, a plurality of circular or ring-shaped, flexible bands D are arranged between the rim B and the tread members C and combined with the springs A in such a way that the tread members C are effectively held in approximate alignment with the rim B of the tire. The bands D, which can be formed conveniently from flat strips of spring steel, are arranged one within the other and are spaced apart, as shown in Figure 2, and they are provided with holes or openings 9 of such form that the springs A can be threaded through same, thus permitting the bands D to occupy substantially the position shown in Figure 2 when the tire is not in motion. When the tire is traveling over a road the bands D flex inwardly and outwardly towards and away from the rim B of the tire as the springs A compress and expand, but they effectively prevent the springs A from moving sidewise, or rather, they limit the sidewise movement of the tread portion of the tire, owing to the fact that all of the springs A of the tire are threaded through said bands in such a way that the springs A at one side of the tire, for example, the upper side, which are not subjected to excessive side strains hold the bands D so securely that said bands are capable of resisting the excessive side stresses to which the springs A at the lower side of the tire are subjected. When ordinary straight, coiled springs of the form shown in Figure 3 are used it is preferable to provide the bands D with substantially arc-shaped holes, as shown in Figure 5, so as to facilitate the threading of said springs through the bands D, but if desired, the tire can be equipped with springs A' of the form shown in Figure 6 whose coils or convolutions are connected together by straight portions 10. When such springs are used the bands D can simply be provided with circular holes for receiving the straight portions 10 of the springs A'.

A resilient tire of the construction above described is admirably adapted for use on trucks and other power operated vehicles that are intended to be used for transporting heavy loads, owing to the fact that the flexible bands D through which the springs A are threaded effectively limit the side sway of the springs A, and thus prevent the tire from collapsing or being destroyed when it is subjected to excessive side thrusts. The tread portion of the tire is rugged enough to enable the tire to be used for carrying heavy loads over rough roads, but it has sufficient flexibility to insure the springs A functioning properly, and thus absorbing the shocks and jolts produced by inequalities or obstructions in the road over which the tire travels. In addition to the desirable features above pointed out, my improved tire is inexpensive to manufacture and it is of such simple design that it is not apt to get out of order when in service.

Having thus described my invention, what I claim as new and desire to secure by Letters Patent is:

1. A spring tire, comprising a jointed tread portion that surrounds a rim, coiled springs interposed between said rim and tread portion, and a flexible band arranged between said rim and tread portion and having openings through which said coiled springs are threaded.

2. A spring tire, comprising a circular flexible tread portion that surrounds a rim, coiled springs interposed between said rim and tread portion throughout the entire circumference of the tire, and a band of spring steel or the like arranged between said rim and tread portion and combined with said springs in such a way that it co-operates with the springs at one side of the tire to resist the side thrusts and stresses to which the springs at the other side of the tire are subjected when in service.

3. A spring tire, comprising a circular flexible tread portion that surrounds a rim, coiled springs interposed between said rim and tread portion throughout the entire circumference of the tire, and a band of spring steel or the like arranged between said rim and tread portion and combined with the springs in such a way that the side thrusts and stresses to which the springs at the lower side of the tire are subjected when the tire is in service are resisted or overcome by the remainder of the springs of the tire.

4. A spring tire, comprising a jointed tread portion that surrounds a rim, coiled springs arranged between said rim and tread portion, and a plurality of resilient bands arranged one within the other in the space between the rim and tread portion and having holes in same through which said coiled springs extend.

5. A spring tire, comprising coiled springs projecting radially from a rim, a tread portion composed of a number of substantially segmental-shaped members arranged in overlapping relation, pivotal connections between said tread members and said springs, and means that extend circumferentially of the tire which holds said tread members in operative relationship with each other.

6. A spring tire, comprising coiled springs projecting radially from a rim, a tread portion composed of a number of substantially segmental-shaped members arranged in overlapping relation, pivotal connections between said tread members and said springs, means that extend circumferentially of the tire which holds said tread members in operative relationship with each other, and a resilient band arranged between said rim and tread members and having openings through which said springs are threaded.

7. A spring tire, comprising a tread portion composed of a number of substantially segmental-shaped members, coiled springs interposed between said tread portion and a rim, and a jointed structure extending circumferentially of the tire and connected to said springs and tread members.

8. A spring tire, comprising a tread portion composed of a number of substantially segmental-shaped members, coiled springs interposed between said tread portion and a rim, a jointed structure extending circumferentially of the tire and connected to said springs and tread members, and a resilient band arranged between said rim and tread portion through which said springs are threaded.

9. A spring tire, comprising coiled springs projecting radially from a rim and arranged in pairs, a tread member pivotally connected to each pair of springs in such a way as to form a single unit, and means for tying the various units of the tire together.

10. A spring tire, comprising a tread portion composed of a plurality of segmental-shaped members arranged in overlapping relation, a set of coiled springs arranged between each of said tread members and a rim, means for pivotally connecting each tread member to the set of springs with which it co-operates, and a jointed structure extending circumferentially around the tire that is pivotally connected to said tread members and to the various sets of springs of the tire.

11. A spring tire, comprising a tread portion composed of a plurality of segmental-shaped members arranged in overlapping relation, a set of coiled springs arranged between each of said tread members and a rim, means for pivotally connecting each tread member to the set of springs with which it co-operates, a jointed structure extending circumferentially around the tire that is pivotally connected to said tread members and to the various sets of springs of the tire, and a resilient band surrounding said rim and having holes in same through which said springs pass.

12. A spring tire, comprising a tread portion composed of a plurality of substantially segmental-shaped members arranged in overlapping relation, coiled springs interposed between said tread members and a rim and arranged in staggered relation and in such a way that each tread member is associated with a pair of said springs, pintle pins that connect said tread members to the springs with which they co-operate, and links arranged circumferentially of the tire and having holes in same through which said pintle pins pass.

13. A spring tire, comprising a tread portion composed of a plurality of substantially segmental-shaped members arranged in overlapping relation, coiled springs interposed between said tread members and a rim and arranged in staggered relation and in such a way that each tread member is associated with a pair of said springs, pintle pins that connect said tread members to the springs with which they co-operate, and links arranged circumferentially of the tire and having holes in same through which said pintle pins pass, said links and pintle pins being so combined that the links lock the pintle pins in operative position and said pins prevent the links from moving sidewise.

14. A spring tire, comprising a tread portion composed of a number of members, each of which is provided at one end with an extension that laps over the adjacent tread member, sets of coiled springs interposed between said tread members and a rim and pivotally connected to said members, a jointed structure extending circumferentially of the tire and combined with said tread members and sets of springs in such a way that it limits the circumferential movement of said tread members relatively to each other, and a plurality of resilient bands arranged one within the other in the space between said rim and tread members and having holes in same through which said springs are threaded.

15. A spring tire, comprising a tread portion composed of a number of members that can move relatively to each other, coiled springs arranged between said tread members and a rim and connected to same, means for limiting the circumferential movement of said tread members relatively to each other, and a resilient element arranged between said rim and tread members and having holes in same through which said springs extend.

DAVID A. GARDEN.